:United States Patent Office 3,725,226
Patented Apr. 3, 1973

3,725,226
ELECTROCHEMICAL INACTIVATION OF PATHOGENS
Glenn E. Stoner, Charlottesville, Va., assignor to Research Corporation, New York, N.Y.
No Drawing. Filed Mar. 1, 1972, Ser. No. 230,953
Int. Cl. C02b 1/82; C02c 5/12; B01k 1/00
U.S. Cl. 204—149                     11 Claims

ABSTRACT OF THE DISCLOSURE

Pathogens existing in an aqueous medium are inactivated by applying a potential across at least one pair of electrodes suitably disposed within said medium, by means of an alternating voltage, such that each of said electrodes is repeatedly passed through an anodic phase and a cathodic phase, wherein during the anodic phase the peak voltage is less than that at which vigorous electrolytic oxygen is generated, and during the cathodic phase, the peak voltage is greater than that at which electrolytic hydrogen is generated, such that during said anodic phase, pathogens contained within said aqueous medium are inactivated at at least one of said electrodes, and during said cathodic phase, said inactivated pathogens are defouled from said electrode.

BACKGROUND OF THE INVENTION

Field of the invention

This invention relates generally to a method for continuously inactivating pathogens existing in an aqueous medium, and more particularly to an electrolytic technique for continuously inactivating pathogens.

Description of prior art

The most common techniques for destroying or inactivating pathogenic microorganisms in aqueous medium have included the use of heat and/or chemical treating agents. However, the energy input required to treat large bodies of water with heat, such as in sewage treatment, is generally insufficient, uneconomical, or inconvenient, and the use of chemical agents is often inadequate, especially where the particular strains of pathogens in the media are unidentified or unattackable by known treating agents. For instance, the pathogenic viruses, especially the nonlipid picornoviruses, such as polio, rhino, entero or the encephalomyocarditis viruses, have been shown to survive chlorination and conventional water treatment methods, and have even been shown to elude many of the standard or lipophilic germicides, such as isopropyl alcohol, the ortho-phenylphenol derivatives, the cationic detergents, or the like. Other, more generalized and commercially economical methods of pathogen inactivation have, therefore, been widely investigated.

One of the more promising alternative methods for the inactivation of pathogens in aqueous media has been the use of electrolytic reactions, whereby an electric current passing through the aqueous medium between appropriate electrodes, causes the formation of oxygen at the anode. While many types of pathogens are oxidized, and thereby destroyed by the addition of high concentrations of oxygen to the medium, many other types of microorganisms, particularly the aerobiotic microorganisms, are stimulated to even higher levels of activity. This stimulation effect has been utilized in a variety of conventional processes wherein microorganic stimulation is a desirable end. For instance, in most sewage processes, aerobiotic microorganisms are used to decompose biodegradable organic matter. Ordinarily, relatively high voltages, as high as 10 volts, are required to attain sufficient oxygen generation for the stimulation of aerobiotic microorganisms, or for the destruction of nonaerobiotic microorganisms. In U.S. Pat. 3,440,157, issued to Gunther, it has been suggested to use voltages as high as 7,500 volts to destroy pathogens.

Recently, it was reported by Stoner et al., "Adsorption of Blood Proteins on Metals Using Capacitance Techniques," Journal of Physical Chemistry, vol. 74, No. 5, p. 1088 (March 1970), that another type of phenomenon can occur when a relatively low voltage is passed through an aqueous medium. It was found that proteinaceous matter coming into contact with non-graphite type electrodes held at particular potentials, usually 1 or 2 volts, will be adsorbed onto the electrode, and will be chemically modified, usually by some type of oxidation reaction.

In U.S. Pat. 3,058,894, issued to Hallum, it was reported that pathogenic microorganisms, in particular, disease-producing viruses, will be adsorbed onto the graphite electrodes at particular voltages, and will be "inactivated" so that their disease-causing properties will be destroyed. According to that disclosure, a constant, fixed potential is applied across the cell which is lower than that necessary for the evolution or formation of electrolysis products at the working electrode, but high enough to cause the transfer of electrons between the anode and the pathogens being treated.

That process had two very serious disadvantages, however. For one, it was found that the process could not be used as a general purpose treatment technique, because it was quite selective in the types of microorganisms adsorbed and inactivated, and would not indiscriminately inactivate all types of microorganisms. Hence, the technique could not be used unless the particular type of pathogens present in the medium were known, and those pathogens were adsorbable under the particular applied potential.

The second difficulty experienced with the Hallum process, was that periodically the electrolysis process had to be discontinued in order to remove and clean the anode. If the anode were not periodically cleaned, the deposit of adsorbed microorganisms would soon reach a sufficiently high level that either the efficiency of adsorption would deteriorate, or the adsorption process would discontinue entirely.

It is known that in sewage and industrial waste facilities which use electrolysis to aerate the waters, the electrodes can be defouled by superimposing an alternating current onto the direct current used. The type of fouling occurring in those types of systems, however, is different from the fouling occurring as the result of adsorption of microorganisms. In the former process, fouling results from the formation of a byproduct sludge from the decomposition of the biodegradable organic matter. In fact, aerobiotic microorganisms are rarely able to even reach the electrode at higher voltages because of the formation of a sheath of generated oxygen surrounding the electrode during electrolysis. Moreover, the aerobiotic microorganisms are repelled from the electrode by the stimulating action of the oxygen so that adsorption is essentially improbable.

The type of fouling occurring in that type of process is therefore distinctly different from the fouling resulting from microorganism adsorption. As discussed in Hallum, in the latter process merely superimposing an alternating current will not necessarily be sufficient to defoul the electrodes.

It has been suggested to use alternating currents in electrolytic treatment of water, wherein the alternating current is not superimposed over a direct current, see U.S. Pat. 3,336,220, issued to Niedl. However, in that instance, the voltage level was set sufficiently high to generate oxygen in order to stimulate microorganism activity and to increase the rate of decomposition of biodegradable organic matter also contained in the water.

Although the Hallum process, therefore, does suggest a first step to electrolytic inactivation of pathogens, that technique is generally inadequate, as a general purpose water treatment technique for the destruction or inactivation of pathogenic microorganisms, and hence, a need continues to exist for such an all-purpose generalized technique.

SUMMARY OF THE INVENTION

Accordingly, it is one object of this invention to provide a method for electrochemically inactivating pathogens in a highly efficient manner.

It is another object of this invention to provide a method for electrochemically inactivating a multiplicity of unidentified pathogens existing in an aqueous medium.

It is still a further object of this invention to provide a method for electrochemically inactivating pathogens without the necessity of frequently or routinely removing the electrodes for cleaning.

These and other objects, as will hereinafter become more readily apparent, have been achieved by applying a potential across at least one pair of electrodes suitably disposed within the aqueous medium to be treated, by means of an alternating voltage, such that each of said electrodes is repeatedly passed through an anodic phase and a cathodic phase, wherein during the anodic phase the peak voltage is less than that at which electrolytic oxygen is vigorously generated, and during the cathodic phase, the peak voltage is greater than that at which electrolytic hydrogen is generated, such that during said anodic phase, pathogens contained within said aqueous medium are inactivated at at least one of said electrodes, and during said cathodic phase, said inactivated pathogens are defouled from said electrode.

DETAILED DESCRIPTION OF PREFERRED EMBODIMENTS

According to the present invention, pathogenic microorganisms are adsorbed, inactivated and desorbed by subjecting the aqueous medium to an applied alternating current of relatively low voltage across a pair of electrodes, at least one of which is capable of having microorganisms adsorbed thereon.

It is believed that as the voltage is increased during the anodic portion of the alternating cycle, the pathogens are adsorbed onto the electrode, and are then inactivated by the oxidation of the pathogen wherein the pathogen gives up at least one electron to the circuit. During the cathodic portion of the cycle, hydrogen is generated which replaces the pathogen on the electrode, and thereby "desorbs" or defouls the pathogen particle from the electrode. Usually, adsorption will occur best at one voltage level and the inactivation reaction will occur best at some higher level. In those instances in which the aqueous medium contains a multiplicity of different pathogen species, therefore, it is possible that both adsorption of one pathogen species will occur simultaneously or approximately simultaneously, with the inactivation of another pathogen species. This is an important aspect of this invention, since it was previously unappreciated by the art that different species of pathogens have different preferred voltage levels at which adsorption and inactivation occur most efficiently. By cycling the voltage over the entire spectrum from zero to just under that voltage at which oxygen is generated, a much wider variety of pathogen species will be adsorbed and inactivated than previously possible using a fixed, constant voltage as suggested in the Hallum patent. During the decreasing voltage phase of the anodic portion of the cycle, a second opportunity will occur to inactivate those adsorbed pathogens not previously inactivated.

As the electrode changes from anodic to cathodic, hydrogen begins to be generated by electrolysis and tends to displace or replace the inactivated pathogens, so that fouling of the electrode will not occur. There is thus no necessity to frequently remove the electrodes for cleaning, which provides obvious advantages.

The theory behind the success of this technique is that at some electrode potential $V_1$, the protein, or polysaccharide, protective coat of the pathogen will cause it to adhere to the electrode surface. As the potential is made more anodic, $V_2$, anodic electrolysis of the pathogen coat will occur causing denaturation and destruction of the disease-producing capacity of the pathogen. At some cathodic potential $V_3$, near the hydrogen evolution range, all protein and organic matter will be dispelled or desorbed from the electrode.

The particular potential range is therefore quite important, since if the potential levels used are too high in the anodic phase, adsorption of the pathogens on to the electrode will be prevented by the generation of oxygen by electrolysis which forms a sheath of oxygen around the electrode. Accordingly, the potentials should not exceed $\pm 5$ volts and preferably should not exceed $\pm 2$ volts.

In measuring electrical potential across the electrodes, the voltage is indicated as being relative to a normal calomel electrode. The minimum potential which can be used in 200 mv.

Any alternating voltage waveform may be used so long as the levels are within this range. Best results are attained with a triangular form of the type:

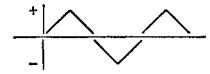

An ordinary sinusoidal waveform can also be used. However, since it does not allow for equal time periods at each voltage level, it is not as desirable from the standpoint of efficiency and effectiveness, but in view of its relative availability, it may be the type most frequently used.

A sawtooth waveform of the type:

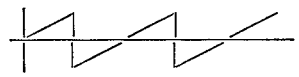

is usable, but is not always as desirable as the triangular waveform. Although it is not completely understood, apparently certain pathogens are adsorbed or inactivated better as the voltage is decreasing as compared to increasing voltage. The triangular waveform, therefore, is best for general utility.

A square-shaped waveform is generally less effective than the use of the above mentioned waveforms.

The current frequency should be from 0.1 cycle per second to 10 cycles per second.

The waveform used need not be symmetrical; that is to say, the periods during which each electrode is in its respective anodic and cathodic states need not be equal. In fact, for certain applications, it may actually be desirable to have a longer anodic cycle for the working electrode. Good results are attainable if the ratio of anodic to cathodic for either electrode is within the range 0.9 to 0.3.

The current density between the electrodes may be from 1 to 20 milliamps/cm.$^2$ and preferably 1 to 5 milliamps/cm.$^2$ at which range oxygen is only sporadically generated. Calculating the power requirements, it can therefore be seen that the maximum power input is quite low, in the order of 2 to 40 milliwatts/cm.$^2$, which makes the process quite advantageous from an industrial point of view.

The electrodes used herein should be of a suitable material which is capable of adsorbing the pathogen. Carbon and graphite are especially preferable for this purpose, since they are relatively inexpensive and they have excellent adsorption properties. Noble metals are also effective, but since they do not clean off as well, and are more expensive, they are not as preferred. Steel electrodes or aluminum electrodes or composite and alloy electrodes might also be used.

When bar type electrodes are used, they may be spaced apart at a distance of 0.01 to 1.0 cm. However, in general, it is desirable to use electrodes of as large a surface area as possible, such as in the form of a mesh or screen.

Temperature and pressure are not any more critical to the considerations of this invention than they are in ordinary electrochemical systems, and the present technique can suitably be conducted at room temperature and at atmospheric pressure.

The pH of the aqueous media being treated is not critical.

Any aqueous medium can be treated in this manner. For instance, this technique is applicable for the destruction of pathogenic organisms in drinking water or well water; for the prevention of slime or algae buildup in water systems, such as near paper mills; for purification of waters in fish hatcheries; for tertiary treatment of sewage; for overnight treatment of swimming pool water, permitting the partial or complete elimination of chlorine for this purpose; for any application which requires total water recycling wherein the build-up of pathogen concentration is detrimental; or like applications.

A wide variety of pathogenic micro or macroorganisms including bacteriae, viruses, disease flukes, protozoa, endoparasites, fungii, nematodes, algae, fungii spores are inactivatable by the techniques of this invention. It has been shown to be successful in inactivating such bacteria as $E.$ $coli$ and furunculosis, and such bacterial viruses as T–4, T–7, $\phi$–X. Also the mammalian viruses, such as picornaviruses, polio virus II, encephalomyocarditis, hepatitis, adenoviruses, myxoviruses, herpes simplex virus, distemper, parainfluenza, adenovirus, paraleukopenia, coxsackie, rhino, influenza, or the like are susceptible to the treatment. Also, the disease flukes are inactivatable by these methods, including the $Nanophyetus$ $salmincola$, $Schistosoma$ $mansoni$ and other Schistosoma and the like. Also the algae, such as $Chlorella$ $pyrenodosa$ are inactivatable. Other pathogens which are inactivatable include the external parasites such as Gyrodactytus; the internal parasites: protozoan, such as Costia and Ichthyophthirus and viral pathogens such as viral hemorrhagic septicemia.

Since in general, inactivation of the pathogen at the electrode will not occur unless the pathogen comes sufficiently close to the electrode, it is desirable to mix, or in some way cause agitation of the aqueous media, or to, in some manner, bring the electrode into contact with as large a portion of the aqueous media as practicable. Where the aqueous medium is held in some type of container, such as a tank or the like, a stirring rod can be inserted into the tank to circulate the medium into contact with the electrode.

If the aqueous medium is being passed through a pipe or other conduit as it is being treated, sufficient contact can be obtained by using a flow having a high Reynolds number.

The electrode has also been made into the form of a large surface area mesh or screen, and inserted into the pipe or conduit, such that most of the aqueous medium will be forced to flow over a portion of the electrode as it passes therethrough. In this instance, both electrodes may be made into this form, or, if the pipe is made of a conducting material, the walls of the pipe may serve as one of the electrodes.

If a pump is used to transfer the aqueous medium, it may be possible to adapt the pump parts as electrodes so that the pump itself would provide the dual function of mass transfer and sterilization.

Having now generally described the invention, a further understanding can be obtained by reference to certain specific examples which are presented herein for purposes of illustration only and are not intended to be construed as limiting unless otherwise so specified.

EXAMPLE I

A glass beaker having a volume of 15 cm.$^3$ was fitted with a pair of carbon rod electrodes, type E. F. Fullam (⅛ inch diameter—spectrographically pure), which were attached to a voltage source such that the voltage could be cycled triangularly and at a suitable frequency.

In this example, the voltage was cycled between +1 volt and −1 volt relative to a saturated calomel electrode at a frequency of 5 seconds per cycle.

Bacteriophage T–4 osmotic shock-resistant strain obtained was prepared, according to the method of Benzinger et al, "Rapid Bacteriophage Sedimentation in the Presence of Polyethylene Glycol and Its Application to Large Scale Virus Purification," Virology, vol. 40, No. 3, p. 734 (1970). The infectious viruses were titrated by removal of 0.1 ml. samples, diluted in a diluting broth and plating in soft agar with $E.$ $coli$ cells. The plaque counts were a measure of the residual infectivity of the virus. The assay was made in accordance with the standard assay procedure as outlined in Adams, "Bacteriophages," Interscience Publishers (1955), pp. 446–451.

The virus concentration in the reactor was $6 \times 10^9$ viruses/ml. The voltage cycling was initiated as soon as the bacteriophage was added to the solution. The viruses were in an M–9 buffer solution used as the electrolyte.

The average number of viruses remaining on the plate was found to be as follows:

| Time (sec.) | Number of cycles | Viruses on plate* (average) |
| --- | --- | --- |
| 0 | 0 | 301 |
| 5 | 1 | 287 |
| 50 | 10 | 254 |
| 500 | 100 | 185 |
| 2,000 | 400 | 64 |

*Each virus (PFU) on the plate corresponds to $3 \times 10^7$ PFU/ml. in the test solution.

EXAMPLE II

The experiment of Example I was repeated, except that the viruses were allowed to remain in the container for 47 minutes before the voltage cycling was initiated. The results are shown as follows:

| Time (sec.) | Number of cycles | Viruses on plate (average) |
| --- | --- | --- |
| 0 | | |
| 0.67 | | 226 |
| 8.3 | | 161 |
| 47 | | 109 |
| 47.8 | 10 | 27 |
| 55.3 | 100 | 6 |
| 90.2 | 400 | 2 |

EXAMPLE III

The experiment of Example I was repeated, except using the mammalian virus, polio virus WI–2 diluted in Hanks buffer salt solution.

The assay procedure was effected using WI–38 diploid human embryonic long monolayer cell cultures TCD$_5$ as outlined in L-Lennetteay et al., "Diagnosis Procedures for Viral and Rickettsial Infections," American Public Health Association, New York (1969), pp. 46–47.

The initial concentration of virus in solution was $1.5 \times 10^6$ viruses/ml.

The carbon rod electrode area was 2 cm.$^2$.

The viruses were allowed to remain in the container 30 minutes at ground potential, after which cycling of the voltage was commenced. The voltage in this example was cycled between ±1.5 volts relative to a saturated calomel electrode for 30 minutes under an equilateral, triangular wave form at a frequency of 1 cycle/5 seconds. After the first 30 minutes, the virus concentration contined to be $1.5 \times 10^6$ virus/ml., but all observable viruses contained in the cell were destroyed by the voltage cycling for 30 minutes.

This experiment was repeated with a large debris/virus concentration with the same result of destruction of all detectable viruses.

EXAMPLE IV

The experiment of Example I was repeated, except for using a reactor having 120 ml. capacity and using as the aquous medium a Bacteriophage $T_4$ in a secondary effluent from Charlottesville Municipal Water Treatment System. The potential applied was from +2.5 volts to −2.5 volts SCE. The pH of the effluent water was 6.35. A magnetic stirrer was used to circulate the aqueous medium. 3 cm.$^2$ size electrodes were used.

The results obtained from this experiment are summarized in the following table.

| Time (minutes) | Percent concentration of viruses based on original concentration $c/c_0$ |
|---|---|
| 0 | 1 |
| 10 | 0.91 |
| 30 | 0.88 |
| 35 [1] | 0.78 |
| 40 | 0.71 |
| 50 | 0.63 |
| 60 | 0.53 |
| 80 | 0.32 |
| 100 | 0.21 |

[1] Begin voltage cycling.

EXAMPLE V

The experiment of Example I was repeated except that a graphite cloth was used instead of carbon rods for the cell electrode. The solution volume was 130 ml. and it was stirred with a magnetic stirrer. The aqueous medium contained the Bacteriophage $T_4$ shock resistant strain. The voltage was cycled between ±2 volts (SEC) using an equilateral triangularly shaped waveform. The frequency was 1 cycle/second.

The results are shown in the following table:

| Time, minutes: | Percent concentration of viruses based on original concentration, $c/c_0$ |
|---|---|
| 0 | 1 |
| 10 | 1.2 |
| 30 | 0.76 |
| Cycles: | |
| 1 | 0.83 |
| 10 | 0.25 |
| 20 | 0.014 |
| 30 | 0 |
| 40 | 0 |

EXAMPLE VI

An electrolytic cell having a capacity of 500 ml. constructed in a polyethylene beaker was prepared and was equipped with a stirrer having 1 cm.$^2$ blades on a 9-inch shaft. A graphite cloth, Grade VCA (UCAR Carbon & Graphite Fiber Products) 0.58 lb./yd. was mounted to the side of the beaker as the electrode. 500 ml. of solution was charged to the cell and stirring was begun at 240 r.p.m. An M–9 buffer salt solution was used. The solution was inoculated with *E. coli*. A voltage was impressed across the electrodes at a potential of ±2 volts (SEC) and a frequency of 1 cycle/second in a triangular waveform. The results are as shown in the following table:

| Time, minutes: | Percent concentration of viruses based on original concentration, $c/c_0$ |
|---|---|
| 0 | 1 |
| 10 | 0.5 |
| 30 | 0.36 |
| 40 | 0.22 |
| 50 | 0.14 |
| 60 | 0.08 |
| 70 | 0.05 |
| 90 | 0 |

EXAMPLE VII

500 *Schistosoma mansoni-cercarie* obtained by standard methods from infected snails was added to 400 ml. of feed. The feed was passed through a flow-through reactor at a rate of 30 cc./min. The reactor was a tubular reactor having an inlet and outlet and having a capacity of 30 ml. Two carbon cloth electrodes of the type above described were inserted into the tube separated by a coarse sponge separator. Each electrode area was approximately 100 cm.$^2$. The voltage impressed across the electrodes was ±3 volts at a frequency of 1 cycle/sec. All of the cercarie passing through the reactor were destroyed. For comparison the same number of cercarie were passed through the reactor at ground potential. It was found that 495 remained alive and only 5 were killed.

In a similar experiment using a stirred batch reactor of 400 ml. capacity and containing 500 cercarie, and cycling the voltage as above, the following results were obtained:

| Time, minutes: | Percent cercarie original concentration, $c/c_0$ |
|---|---|
| 2 | 100 |
| Voltage cycling: | |
| 3 | 33 |
| 6 | 0 |
| 12 | 0 |
| 19 | 0 |

Having now fully described the invention, it will be apparent to one of ordinary skill in the art that many changes and modifications can be made thereto without departing from the spirit or scope of the invention.

What is claimed as new and desired to be secured by Letters Patent is:

1. A process for inactivating pathogens existing in an aqueous medium which comprises:

applying a potential across at least one pair of electrodes suitably disposed within said medium, thereby generating an alternating current, such that each of said electrodes is repeatedly passed through an anodic phase and a cathodic phase, wherein during the anodic phase the peak voltage is less than that at which vigorous electrolytic oxygen is generated, and during the cathodic phase the peak voltage is greater than that at which electrolytic hydrogen is generated, such that during said anodic phase pathogens contained within said aqueous medium are inactivated at at least one of said electrodes and during said cathodic phase, said inactivated pathogens are defouled from said electrode.

2. The process of claim 1, wherein said potential has a peak value of less than ±5 volts.

3. The process of claim 1, wherein the waveform of said applied potential is triangular.

4. The process of claim 3, wherein said alternating current has a frequency of 0.1 cycle/second to 10 cycles/second.

5. The process of claim 2, wherein said potential has a peak value of greater than ±1 volt during said cathodic phase.

6. The process of claim 1, wherein at least one of said electrodes are in the form of a high surface area web.

7. The process of claim 1, wherein said potential has a peak value of ±2 volts.

8. The process of claim 7, wherein said pathogen is E. coli, T-4, T-7 or φ-X bacterial virus.

9. The process of claim 1, wherein said pathogen is a mammalian virus selected from the group consisting of picornaviruses, polio virus II, encephalomyocarditis, hepatitis, adenoviruses, myxoviruses, herpes simplex virus, distemper, parainfluenza, adenovirus, paraleukopenia, coxsackie, rhino and influenza.

10. The process of claim 1, wherein said pathogen is a disease fluke selected from the group consisting of *Nanophyetus salmincola* and *Schistosoma mansoni*.

11. The process of claim 1, wherein said pathogen is algae.

References Cited
UNITED STATES PATENTS

| | | | |
|---|---|---|---|
| 447,585 | 3/1891 | Schroeder | 204—152 |
| 3,402,120 | 9/1968 | Allen et al. | 204—149 X |
| 3,518,174 | 6/1970 | Inoue | 204—149 |
| 3,547,801 | 12/1970 | Paine | 204—149 X |
| 3,600,286 | 8/1971 | Sabins | 204—149 |
| 3,625,884 | 12/1971 | Waltrip | 210—19 |

JOHN H. MACK, Primary Examiner

A. C. PRESCOTT, Assistant Examiner

U.S. Cl. X.R.

210—19

UNITED STATES PATENT OFFICE
CERTIFICATE OF CORRECTION

Patent No. 3,725,226                    Dated April 3, 1973

Inventor(s) Glenn E. Stoner

It is certified that error appears in the above-identified patent and that said Letters Patent are hereby corrected as shown below:

Column 6, line 68, delete "L. Lennetteay et al" and insert --Lennett, et al--

Column 9, line 3, delete "7", insert --1--

Signed and sealed this 12th day of February 1974.

(SEAL)
Attest:

EDWARD M. FLETCHER, JR.          C. MARSHALL DANN
Attesting Officer                 Commissioner of Patents